Nov. 22, 1966 R. E. THOMA 3,287,278
FAST REACTOR FUEL
Filed July 1, 1965

INVENTOR.
Roy E. Thoma
BY
ATTORNEY.

3,287,278
FAST REACTOR FUEL
Roy E. Thoma, Oak Ridge, Tenn., assignor to the United States of America as represented by the United States Atomic Energy Commission
Filed July 1, 1965, Ser. No. 469,010
1 Claim. (Cl. 252—301.1)

The present invention relates generally to reactor fuels and more particularly to molten salt fuel compositions which are suitable for use as fuels in a fast breeder-type molten salt reactor.

The availability of large amounts of plutonium and the potential advantages in the use of fast neutrons for breeding have prompted investigations into the use of molten salts as fast breeder reactor fuels. Various compositions useful as such fuels have been suggested and generally comprised fluoride and/or chloride mixtures. Due to the moderating effect of fluorides, only chloride mixtures have been studied as fast fuels and with respect to such chloride mixtures only the isotope $^{37}Cl$, which has a cross section suitable for use in a reactor core fluid, has been investigated. In evaluating potential candidates for fast fuels certain criteria have been set to insure the successful operation of a reactor system incorporating such as a fuel. Broadly, the criteria for a chloride core fluid are (1) that the molten salt mixtures have a high heavy metal solubility, preferably above 30 atom percent of uranium and/or plutonium, ranging from wholly plutonium to 5:1 mixtures of Pu:U, and (2) that the liquids temperature should be below 600° C. and preferably between 500°–600° C.

It is a general object of this invention to provide a fast reactor fuel composition.

Another object is to provide a molten chloride salt fuel composition which is suitable for use as fuel in a fast breeder-type molten salt reactor system.

A further object is to provide a fast reactor fuel composition which has high solubility for fissionable materials and a liquidus temperature below 600° C.

Figure 2:
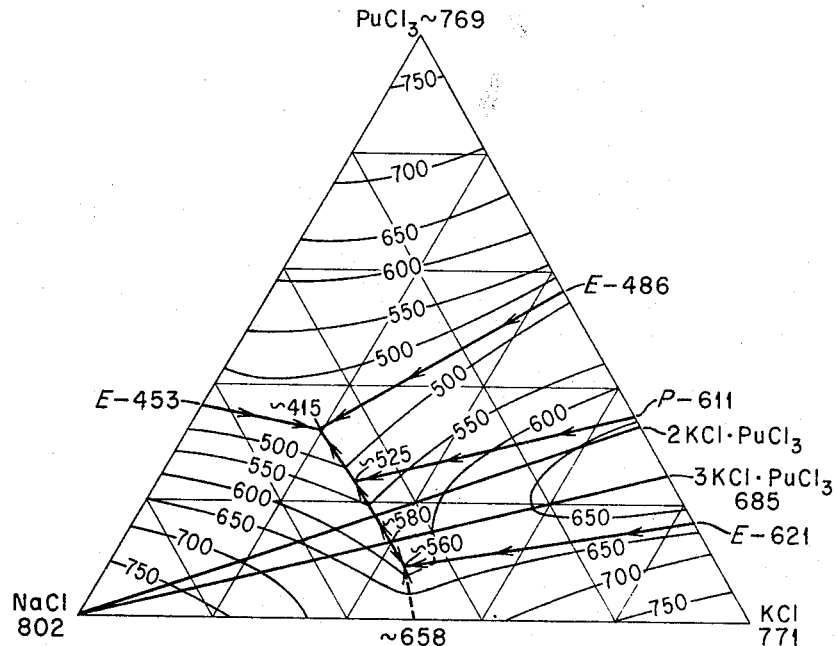
FIG. 2 is the phase diagram for the ternary system $NaCl-KCl-PuCl_3$.
Figure 1:
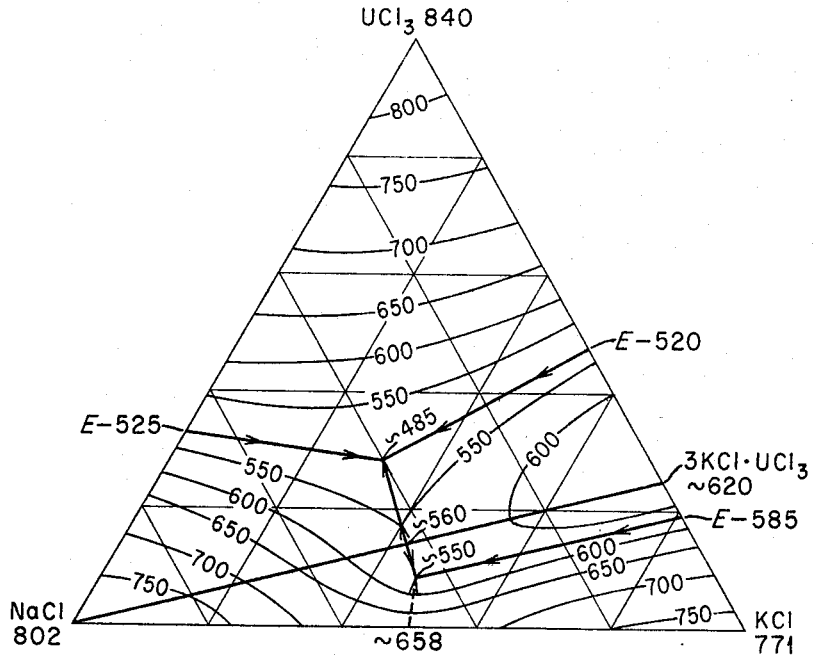
FIG. 1 is the phase diagram for the ternary system $NaCl-KCl-UCl_3$.

These and other objects which will be apparent to those skilled in the art are accomplished by providing a fast reactor fuel composition comprising 30 mole percent of a metal chloride selected from the group consisting of $UCl_3$, $PuCl_3$ and mixtures thereof and 40 mole percent KCl and 30 mole percent NaCl said fuel composition having a liquidus temperature below about 485° C. It has been found that the present molten salt fuel composition has a substantial uranium and/or plutonium solubility below 600° C. Referring to FIGS. 1 and 2, the system $NaCl-KCl-UCl_3$ is seen to have a maximum solubility (at temperature below 600° C.) of about 55 mole percent, and the system $NaCl-KCl-PuCl_3$ has a maximum plutonium solubility (below 600° C.) of about 65 mole percent. These heavy metal solubilities more than adequately satisfy the corresponding criteria for incorporation of such fuel compositions in a fast reactor system. Moreover, it may be seen from FIGS. 1 and 2 that the two systems melt at about the same temperature and that their isotherms are strikingly similar. From this, coupled with the close similarity of the uranium and plutonium metal species, the respective systems are essentially compatible so as to present no problem in mixing the desired Pu:U ratios, i.e., from wholly plutonium to 5:1 mixtures of Pu:U.

In a preferred embodiment of this invention, the molten chloride salt fuel composition comprises a eutectic mixture of the approximate composition of 30 mole percent NaCl–40 mole percent KCl and 30 mole percent heavy metal selected from $UCl_3$, $PuCl_3$, and mixtures thereof. The corresponding melting temperatures for the eutectic mixtures of $NaCl-KCl-UCl_3$ and $NaCl-KCl-PuCl_3$ are about 485° C. and 415° C., respectively. In preparing the eutectic salt mixture, the isotope $^{37}Cl$ may be obtained by any one of a number of conventional isotope separation methods. For example, isotope $^{35}Cl$ may be enriched (>99%) with isotope $^{37}Cl$ by a thermal diffusion process. For a detailed description of such process see H. Remy's Treatise on Inorganic Chemistry, vol. 11, 1956, p. 551 at first paragraph. There it was stated that isotope $^{35}Cl$ may be enriched with $^{37}Cl$ up to about 99.6% by thermal diffusion techniques.

The herein-disclosed eutectic molten chloride salt composition, for example, may be used in the fast breeder reactor disclosed in S.N. 425,645, filed January 14, 1965, now Patent No. 3,262,856, in the name of Edward S. Bettis for "Neutronic Reactor." Specifically, as shown in FIG. 5 therein, a fast breeder, fused-salt fueled, molten-metal-coolant neutronic reactor is described. It is to be understood that, in citing such a specific reactor embodiment, it is not to be construed as limiting the scope of the intended use of the herein-disclosed molten chloride reactor fuel compositions but rather is to serve merely as one illustration of a complete reactor system wherein the present salt composition may be employed. The following example provides further particulars of the preferred eutectic salt composition as the fuel composition for the above-mentioned fast breeder reactor.

*Example*

The fast breeder reactor referenced hereinbefore is operated on a core composition as follows:

| Component | Mole percent | Wt. percent |
|---|---|---|
| NaCl | 30 | 12.3 |
| KCl | 40 | 15.5 |
| $UCl_3$ or $PuCl_3$ | 30 | 72.2 |

The core of the referenced reactor will contain 205 cu. ft. of fuel or about 64,000 lbs. of fuel salt of the above composition at a density of approximately 5 g./cc.

The fuel composition may be prepared by melting small batches (about 250–300 lbs.) of the salt components in the above-described ratios, homogenizing the mixture and purifying. Purification can be achieved by any suitable means such as, for example, purging the molten mixture with anhydrous HCl gas.

What is claimed is:

A fast reactor fuel composition comprising substantially 30 mole percent of a metal chloride selected from the group consisting of $UCl_3$, $PuCl_3$ and mixture thereof, substantially 40 mole percent KCl, and substantially 30 mole percent NaCl, said fuel composition having a liquidus temperature below about 485° C.

References Cited by the Examiner

UNITED STATES PATENTS 2,920,024  1/1960  Barton et al. _____ 252—301.1

OTHER REFERENCES

A.E.C. Documents: ANL–6792, October 1963, pp. 553–555 and 557–564. LA–2661, April 1962, pp. 7–9. ORNL–3708, November 1964, pp. 316–318.

Nuclear Science Abstracts: vol. 11, Abstract No. 7568, July 1957; vol. 15, Abstract No. 22180, Sept. 1961, and vol. 15, Abstract No. 30623, Nov. 1961.

References Cited by the Applicant

Nuclear Science Abstracts: vol. 16, 11264.

L. DEWAYNE RUTLEDGE, *Primary Examiner.*